United States Patent Office 3,459,815
Patented Aug. 5, 1969

3,459,815
CHROMIC ION CONTAINING CLAY CATALYST AND PROCESS FOR PRODUCING ALCOHOLS FROM OLEFINS
Charles R. Noddings and Robert D. Cleary, Midland, and Ronald G. Gates, Breckenridge, Mich., assignors to The Dow Chemical Company, Midland, Mich., a corporation of Delaware
No Drawing. Filed May 4, 1966, Ser. No. 547,443
Int. Cl. C07c 29/04; B01j 11/06, 11/58
U.S. Cl. 260—641                9 Claims The present invention relates to the production of secondary and tertiary alcohols, containing from 3 to 5 carbon atoms per molecule, from the corresponding mono-olefins, and more particularly, to the production of secondary butyl alcohols from olefins by the direct combination of the mono-olefin and water vapor in the presence of a novel solid catalyst consisting essentially of montmorillonite clay containing chromic ion deposited by cationically exchanging the clay with a chromium salt.

It is well known from prior art that an olefin may be hydrated in the presence of various catalysts to obtain the corresponding alcohol. This can be accomplished in either the vapor or the liquid phase. However, prior liquid processes employ highly corrosive compounds such as sulfuric acid and accordingly are not entirely satisfactory for commercial production, and most known prior art vapor phase processes utilizing a solid catalyst must be operated at high pressures, and employ catalysts which are relatively expensive and have a comparatively short life. It is also known from prior art, e.g. British Patent 692,800, that natural montmorillonite clay is effective as a catalyst for the vapor phase process.

However, it is our discovery that activated montmorillonite clay containing chromic ion, deposited by cationically exchanging the clay with a chromium salt, is more effective in the hydration of mono-olefins to alcohols than the clay alone. The novel catalyst is efficient, non-corrosive and inexpensive and permits the process to use low pressures. Under the same conditions the cationically exchanged clay is two to six times as active as the untreated clay.

Montmorillonite is a clay of the bentonite type, and large deposits thereof are found in various parts of the United States as well as in other parts of the world. Its major constituents are silica and alumina and it contains a minor amount of alkali metal or alkaline earth metal oxide. Activated montmorillonite is a material which is prepared in a known manner by pretreating the montmorillonite clay with a mineral acid, usually sulfuric acid. This treatment leaches certain impurities from the clay. The clay, following treatment with acid, washing and drying to remove the acid-susceptible impurities, is in an activated form. This form is well known and used in catalytic cracking. One such treated clay is sold under the trade name of "Super Filtrol."

The catalyst that is employed in accordance with the present invention is made by preparing a slurry of the alkaline earth metal form, the alkali metal form or a mixture of both forms of activated montmorillonite clay in an aqueous solution of a chromium cation-containing salt and maintaining the heterogeneous mixture in such slurry form until the amount of chromium deposited is approximately equal to the exchange capacity of the clay. The exchange capacity is due mainly to the alkali metal and/or alkaline earth metal oxide in the clay and can be approximated by knowing the percent oxide in the clay. Solutions of from 6 to 12 weight percent chromium salt, slurry periods of from 4 to 48 hours and exchange capacities giving from .7 to 1.7 weight percent chromium in the catalyst are typical. The exchange can be done at temperatures varying from room temperature to the boiling point of the solution with no significant change in the activity of the catalyst produced. After the exchange the catalyst is separated from the liquid, water-washed, formed into pellets and dried at a temperature of from 55° to 500° C.

It has also been found that the strength of the alkaline earth form of catalytic materials of the present invention can be materially increased by providing 10 to 30 weight percent of the clay composition of the alkali metal type. The presence of the alkali metal form of clays improves the side crushing strength of the extruded form of the alkaline earth form of the clay. Representative clays of the alkali metal montmorillonite clays which add side crushing strength are "Volclay," a sodium montmorillonite clay, and hectorite, a lithium montmorillonite clay.

A preferred catalyst composition is a calcium form of the activated montmorillonite clay which has been exchanged with a chromium salt and which has been mixed with from 10 to 30 percent by weight of an alkali metal form of the activated montmorillonite clay. The alkali metal form may be mixed with the alkaline earth form and both exchanged with a chromium salt, or the two forms may be separately exchanged, then mixed. It is also to be understood that the alkali metal form may be employed in a non-exchanged state and will still impart strength but will not add much to the catalytic activity. Specifically, a Super Filtrol clay exchanged with about .7 to 1.7 weight percent chromium mixed with 10 to 20 percent by weight of a chromium exchanged sodium form of montmorillonite is an excellent catalytic material which, when pelleted as a $\frac{3}{16}$ inch diameter pellet, has a side crushing strength of from about 10 to 20 pounds.

The general process for the vapor phase hydration of olefins is adequately disclosed in the prior art and generally comprises passing a gaseous mixture of water vapor and olefin, diluted if desired by an inert hydrocarbon gas, at an elevated temperature through the catalyst enclosed in an appropriate converter. The reaction products and unreacted materials are treated by a suitable means to recover the alcohols formed and the unreacted olefin is recycled to the converter. Our discovery utilizes the same general process; however, the process conditions are somewhat milder than those disclosed by prior art.

In accordance with the present invention a vapor mixture of olefin and steam containing from 0.1 to about 1.25 moles of water per mole of olefin is brought into contact with the catalyst maintained at a temperature of from 50° C. to 230° C. and at a pressure of from one to about 30 atmospheres. These three variables are not completely independent. The catalyst cannot operate with any liquid phase present since liquid tends to disintegrate the catalyst pellets. Thus, the water concentration is critical to the extent that under the chosen temperature-pressure conditions the olefin water vapor stream with respect to the water content is below its dew point. At water concentrations close to the dew point for particular pressure and temperature there is obtained a maximum yield to the alcohol. Above the dew point catalyst activity is markedly lowered. Flow rates of olefin have been successfully employed up to a space velocity of 600 volumes of feed per volume of catalyst per hour at STP.

Under the above ranges of conditions the percent conversion, that is the mole percent of olefin consumed per pass, is from 1 to 8 percent for olefin feed; and the selectivity, that is the mole percent of the converted olefin going to the alcohol, is from 60 to 100 percent for butene feed. The main non-selective reaction products below the dew point are the dimer of the olefin and the ether. Yield, that is the mole percent of olefin going to the alcohol per pass, and conversion are directly proportional to the absolute pressure. It is to be understood that the hydration follows the Markownikoff Rule, thus, the hydration of 1-butene and 2-butene both give secondary butyl alcohol. For the conversion of butene to secondary butyl alcohol, In runs 4 and 5 the catalyst was prepared in a manner similar to that of runs 3 and 6 except that the catalyst was cation exchanged for a period of 24 hours at room temperature.

| Feed, 2-butene | Run | | | | | |
|---|---|---|---|---|---|---|
| | 1 | 2 | 3 | 4 | 5 | 6 |
| S.T.P. space velocity of olefin v./v./hr | 577 | 575 | 598 | 98 | 76 | 120 |
| S.T.P. space velocity of $H_2O$ v./v./hr | 113 | 137 | 157 | 21 | 94 | 27.5 |
| Temperature, °C | 155 | 155 | 155 | 145 | 200 | 145 |
| Pressure, p.s.i.g | 150 | 150 | 150 | 200 | 400 | 200 |
| Conversion, mole percent | 1.7 | 0.7 | 1.8 | 3.55 | 6.82 | 3.85 |
| Selectivity, mole percent | 48 | 87 | 80 | 75.3 | 66.4 | 71.8 |
| Yield: Alcohol flow rate out of reactor, based on 100 space velocity of olefin feed, gms./hr | .54 | .41 | .96 | 1.77 | 2.99 | 1.83 | reaction pressures of 100, 200, and 400 p.s.i.g. give percent conversions of approximately 1 to 2, 3 to 4 and 6 to 8, respectively. At these same conditions isobutylene is converted to tertiary butyl alcohol at somewhat higher conversion levels and propylene and the pentenes are converted to their respective alcohols at approximately the same level as the butenes.

At any particular pressure and temperature, percent conversion and percent yield to alcohol go through a maximum as the water concentration approaches the dew point. For normal operation in the 50° C. to 230° C. temperature range, the temperature of the catalyst is held somewhat above the dew point for a particular water concentration and pressure. Thus, there is desirably maintained a 10° to 40° C. superheat condition in the catalyst bed. Under the above conditions the catalyst will operate for weeks with no regeneration and no significant change in activity.

The following example illustrates but does not limit the invention.

EXAMPLE 1

Fourteen hundred cubic centimeters of an aqueous 6 weight percent $CrCl_3$ (chromic chloride) solution were put in a beaker and 500 grams of a commercially available montmorillonite clay (this was a $H_2SO_4$ activated clay) added while the mixture was stirred. The resulting slurry was agitated for 48 hours at a temperature between 90° and 100° C. The slurry was then filtered and the filter cake washed with distilled water until the washwater showed no test for chloride. The wet catalyst was then put through an extruder to form 3/16 inch diameter by 1/8 inch long cylindrical pellets. The pellets were dried at 45° C. for 48 hours to remove the bulk of the water, then overnight at a temperature of 125° C.

Two hundred cubic centimeters of this catalyst were placed in an 8" long, 1.4" internal diameter stainless steel reactor. Temperature control of the catalyst bed was effected by a steam jacket around the reactor. Upstream of the reactor was an electrically heated water saturator wherein a captive volume of water was allowed to evaporate into the olefin vapors stream. A thermistor element, in a thermowell, was employed to maintain saturator temperature. Liquid olefin feed from a storage cylinder was introduced into the bottom of the saturator from a coil passing through the heated water. The saturator thus acted also as the olefin feed vaporizer. Steam and olefin were taken off the top of the saturator and fed to the reactor.

Downstream of the reactor was a pressure relief valve followed by a condensation train consisting of a trap cooled with ice, a trap cooled with solid carbon dioxide and a wet test meter. Product analyses were made by vapor phase chromatography. Runs 3 and 6 of the enclosed table indicate the conditions used and the results obtained using the catalyst as prepared above.

Runs 1 and 2 utilized the clay without chromium ion exchange and are included for comparison. The apparatus employed in each test set forth was the same as that described above.

In a similar operation as run No. 3 of Example 1, propylene, isobutene and 1-butene were employed in place of 2-butene to produce isopropyl alcohol, tertiary butyl alcohol, and secondary butyl alcohol, respectively. The above named alcohols were produced in approximately the following yields (alcohol in gm./hr. flow rate out based on 100 v.v./hr. of olefin feed), 0.8-isopropylalcohol, 7-tertiary butyl alcohol and 1-secondary butyl alcohol.

EXAMPLE 2

To illustrate the increased strength of the catalyst of the present invention when the sodium form of the activated montmorillonite is added, the side crushing strength of the various mixtures and the conversion of 2-butene to its corresponding alcohol was obtained in the same manner as Example 1.

| Clay | Side crushing strength lb./in.² | Test | Yield |
|---|---|---|---|
| (1) Activated Ca form of montmorillonite (Super Filtrol) | 6 | 1 | 0.54 |
| (2) Chrome exchanged (1) | 2 | 3 | 0.96 |
| | | 4 | 1.77 |
| (3) (2) plus 20% sodium form | 20 | 4 | 1.7 |

We claim:

1. In a method for the production of a non-primary alcohol containing from 3 to 5 carbon atoms per molecule from the corresponding mono-olefin which comprises bringing a vapor mixture containing the mono-olefin and water vapor in contact with a solid catalyst the improvement which consists of employing as the catalyst a mineral acid treated montmorillonite clay containing chromium in the chromic ion form replacing at least a portion of the exchange sites of said clay at a temperature between 50° C. and 230° C.

2. A method as described in claim 1 in which the alcohol is secondary butyl alcohol and said olefin is n-butene.

3. A method as described in claim 1 in which the catalyst consists essentially of calcium form montmorillonite clay containing chromic ion deposited by cationically exchanging the clay with a chromium salt.

4. A method as described in claim 3 in which the alcohol is secondary butyl alcohol and said olefin is n-butene.

5. A method as described in claim 1 in which the reaction is carried out at a pressure between 1 and 30 atmospheres.

6. A composition comprising an acid treated montmorillonite clay further treated by cation exchange with chromium ion having a valence of 3.

7. A composition of claim 6 wherein said acid treated montmorillonite clay is exchanged with from 0.7 to 1.7 weight percent of chromium ion.

8. A composition of claim 7 which is a mixture of from 10 to 30 weight percent of an acid treated alkali metal form of a montmorillonite clay exchanged with 0.7 to 1.7 weight percent of chromic ion and from 90 to 70 weight percent of an acid treated alkaline earth metal form of a montmorillonite clay exchanged with 0.7 to 1.7 weight percent chromic ion.

9. The catalyst of claim 8 wherein said acid for treatment is sulfuric acid, said alkali metal is sodium and said alkaline earth metal is calcium.

References Cited

UNITED STATES PATENTS

| | | | |
|---|---|---|---|
| 2,504,618 | 1/1950 | Archibald et al. | 260—641 |
| 2,815,391 | 12/1957 | Taylor | 252—458 X |
| 2,797,247 | 6/1957 | Keith | 252—450 X |
| 3,076,036 | 1/1963 | Hansen | 260—641 |

FOREIGN PATENTS

| | | |
|---|---|---|
| 466,609 | 6/1937 | Great Britain. |

DANIEL E. WYMAN, Primary Examiner

C. F. DEES, Assistant Examiner

U.S. Cl. X.R.

23—112; 252—450, 458